United States Patent
Heo

(10) Patent No.: US 8,587,259 B2
(45) Date of Patent: Nov. 19, 2013

(54) METHOD OF ESTIMATING TEMPERATURE OF BATTERY

(75) Inventor: Sangjin Heo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 408 days.

(21) Appl. No.: 12/960,792

(22) Filed: Dec. 6, 2010

(65) Prior Publication Data
US 2012/0074950 A1    Mar. 29, 2012

(30) Foreign Application Priority Data
Sep. 27, 2010  (KR) .................. 10-2010-0093087

(51) Int. Cl.
*H02J 7/00*    (2006.01)
*H01M 2/34*    (2006.01)

(52) U.S. Cl.
USPC .......... 320/150; 320/154; 320/160; 320/104; 429/61; 429/62

(58) Field of Classification Search
USPC ....................................... 320/150
See application file for complete search history.

(56) References Cited

U.S. PATENT DOCUMENTS

| | | | |
|---|---|---|---|
| 5,099,211 A * | 3/1992 | Nowak | 324/434 |
| 6,902,319 B2 * | 6/2005 | Wu et al. | 374/141 |
| 7,498,772 B2 * | 3/2009 | Palladino | 320/132 |
| 7,622,894 B2 * | 11/2009 | Kawahara et al. | 320/127 |
| 7,622,896 B2 * | 11/2009 | Nakagawa | 320/150 |
| 2007/0120537 A1 * | 5/2007 | Yamamoto | 320/150 |
| 2007/0139017 A1 * | 6/2007 | Marchand et al. | 320/150 |

FOREIGN PATENT DOCUMENTS

| | | | |
|---|---|---|---|
| JP | 2003-185504 | * | 7/2003 |
| JP | 2003185504 A | | 7/2003 |
| JP | 2008001254 A | | 1/2008 |
| JP | 2008-089417 A | | 4/2008 |
| JP | 2008249459 A | | 10/2008 |
| JP | 2009-103471 A | | 5/2009 |
| JP | 2010135075 A | | 6/2010 |
| KR | 1020090024363 | | 3/2009 |

* cited by examiner

*Primary Examiner* — Yalkew Fantu
(74) *Attorney, Agent, or Firm* — Edwards Wildman Palmer LLP; Peter F. Corless

(57) ABSTRACT

The present invention relates to a temperature estimating method of a battery. A predetermined module of a battery is equipped with a temperature sensor and a current/voltage sensor(s). Whether the battery deteriorates can be determined by using the measured temperature, current, and voltage.

9 Claims, 3 Drawing Sheets

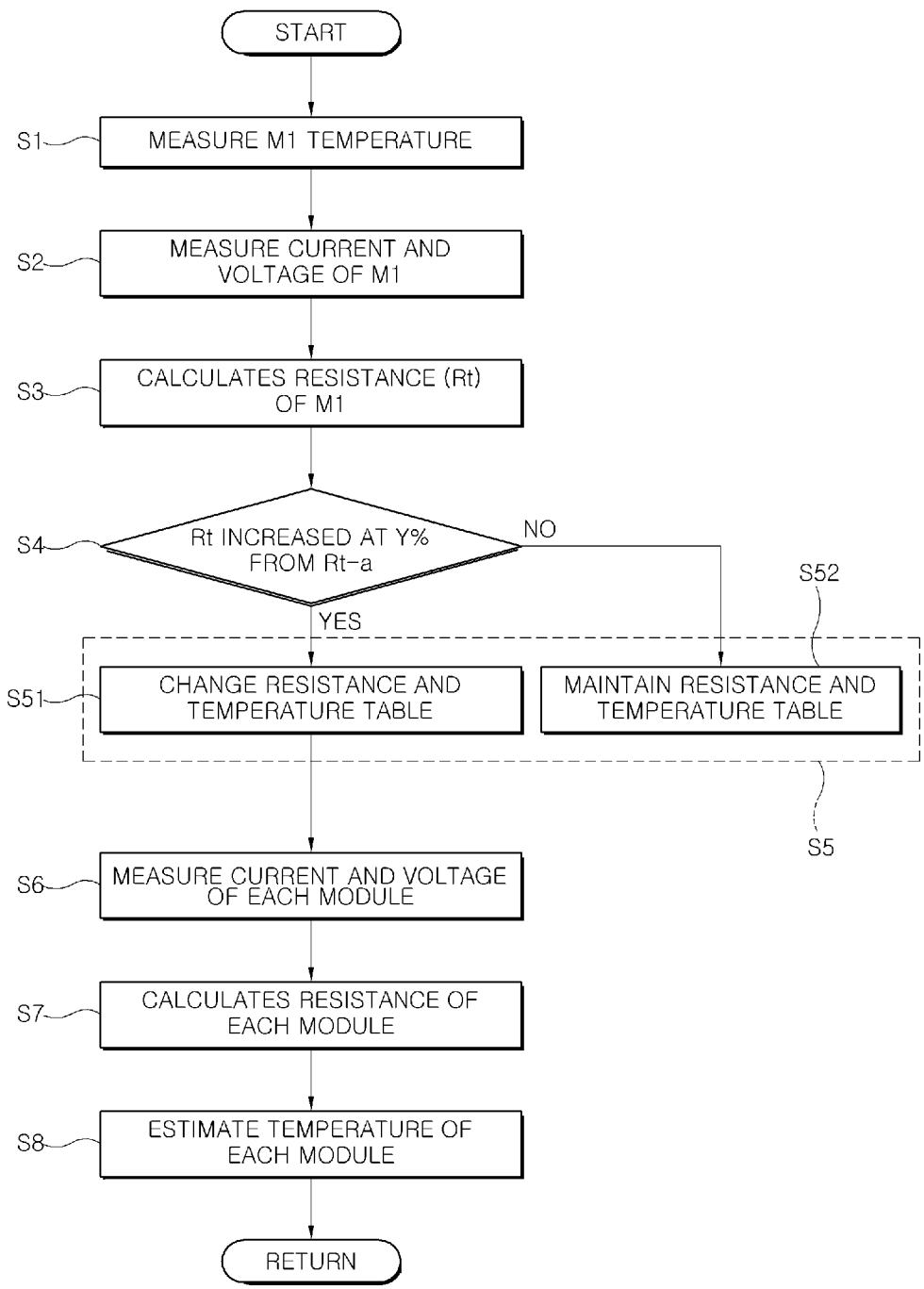

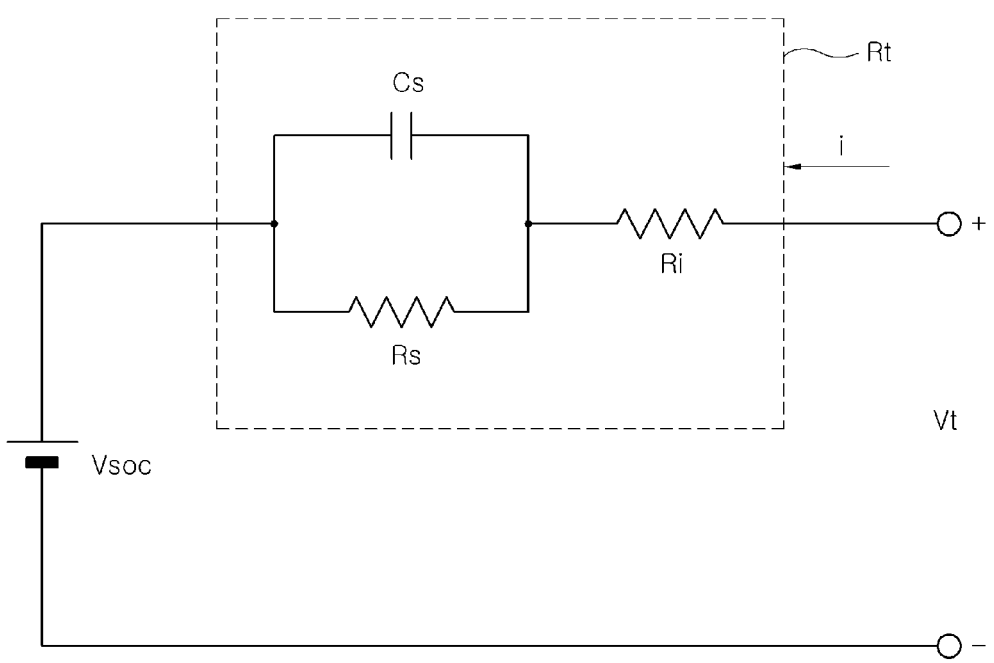

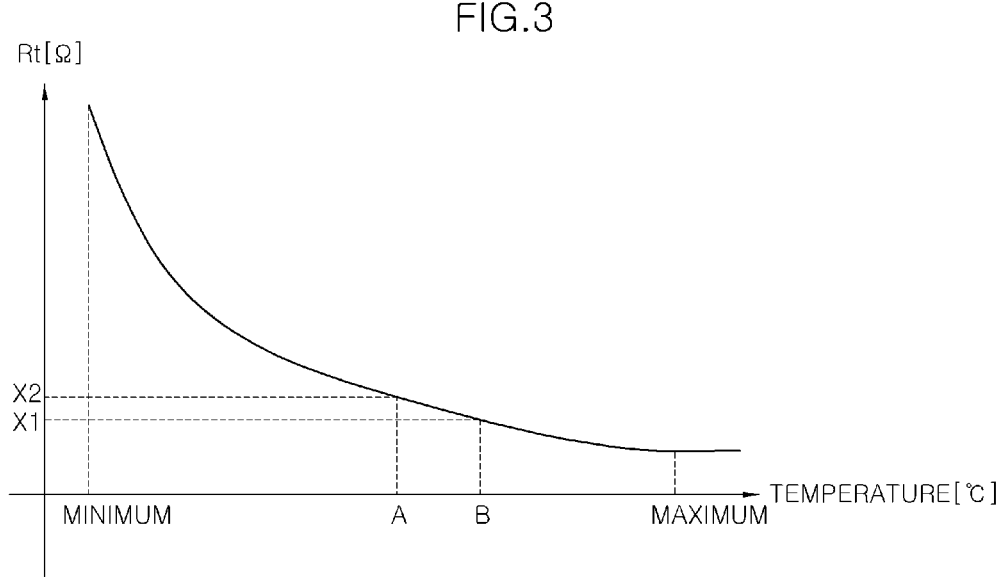

METHOD OF ESTIMATING TEMPERATURE OF BATTERY

CROSS-REFERENCE TO RELATED APPLICATIONS

The present application claims priority to Korean Patent Application Number 10-2010-0093087 filed Sep. 27, 2010, the entire contents of which application is incorporated herein for all purposes by this reference.

BACKGROUND OF THE INVENTION

1. Field of the Invention

The present invention relates to a method of estimating the temperature of a battery, which can estimate the temperature of the battery from a temperature of a module of the battery and a resistance thereof, thereby minimizing the number of required temperature sensors.

2. Description of Related Art

A large-capacity and large-sized battery implemented by connecting a plurality of modules in parallel is widely used as power sources for operating motors of hybrid electric vehicles. Each of the modules is equipped with a temperature sensor to determine the amount of charging and the discharging driving performance of the batteries.

However, since each module is equipped with a temperature sensor, the cost and the dimension of the battery may be increased by the temperature sensors. Further, the battery may be deteriorated by the increase of resistance due to the using time and environment; however, it is difficult to determine whether each battery module is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

In one embodiment, the present invention provides a method of estimating the temperature of a battery. According to the method, a temperature of a predetermined module of the modules of a battery is measured at predetermined time intervals by using a temperature sensor mounted in the predetermined module. A current and a voltage of the predetermined module are measured at predetermined time intervals by using a current and voltage sensor(s) mounted in the predetermined module and the change of the currents and voltages are calculated. A resistance of the predetermined module is calculated by using the change of the currents and voltages. Whether the calculated resistance increases by a predetermined amount at a predetermined time interval and whether the temperature of the predetermined module changes at a predetermined time interval are determined. Currents and voltages of the other modules are measured at predetermined time intervals and the change of currents and voltages are calculated. A total resistance of the entire modules is calculated from the change of currents and voltages. The temperature of the battery is estimated by identifying a temperature corresponding to the total resistance in a preset resistance and temperature table.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

With the method, whether deterioration of the battery can be determined from the measured temperature measured by the temperature sensor mounted in the predetermined module and the calculated resistance, thereby minimizing the number of required temperature sensors.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 1 is a flowchart illustrating a method of estimating the temperature of a battery according to an exemplary embodiment of the present invention.

FIG. 2 is a diagram showing a circuit of a predetermined module of a battery.

FIG. 3 is a view showing an example of a resistance and temperature table used in the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Embodiments of the present invention are described below with reference to FIGS. 1 to 3.

A battery comprises a plurality of battery modules that are connected in series by a conductor between the cathode terminal and the anode terminal of the adjacent battery modules. Among the battery modules, a predetermined module M1 is equipped with a temperature sensor.

The temperature of the module M1 is measured by the temperature sensor at predetermined intervals and the measured temperatures are transmitted to a battery management system (hereafter, referred to as "BMS") which is connected directly or indirectly to the battery for controlling the operation of the battery (S1). The measured temperatures of the module M1 are collected and stored in a predetermined memory of the BMS.

When current is supplied to the battery, voltages of the battery modules are changed due to the applied current in accordance with the conditions of the battery modules. The current and voltage of the module M1 are measured at predetermined intervals by a current and voltage sensor equipped with the module M1 and the measured currents and voltages are collected and stored in a predetermined memory of the BMS (S2).

From the collected currents and voltages, the BMS calculates resistances of the module M1 (S3). The calculation can be made by any available method. A preferable method is to use a least square method. The relationship among a current, a voltage, and a resistance of the module M1 is represented by Formula 1.

$$Vt(t)-Vsoc(t)=Rt(t) \times i(t)$$

where Vt(t) is a terminal voltage of the module M1 at a time, t, Vsoc(t) is an open circuit voltage (OCV) of the module M1 at the time, t, Rt(t) is a total resistance of the module M1 at the time, t, and i(t) is a current of the module M1 at the time, t.

As shown in FIG. 2, the total resistance Rt of the module M1 includes a charge transfer resistance Rs and a double layer capacitance Cs connected in parallel with the charge transfer resistance Rs, and an internal resistance Ri connected in series to them. The internal resistance Ri, charge transfer resistance Rs, and double layer capacitance Cs can be calculated by, for example, a sequential least square method using the currents and voltages collected in the memory of the BMS. The relationship thereof is represented by Formula 2.

$$Vt(t) - Vsoc(t) = \begin{bmatrix} i(t), i(t-1), \\ Vt(t-1) - Vsoc(t-1) \end{bmatrix} \begin{bmatrix} Ri \\ \beta \Delta T - Ri \\ 1 - \alpha \Delta T \end{bmatrix} \quad \text{[Formula 2]}$$

where Vt(t−1) is a terminal voltage of the module M1 at a time, t−1 stored in the memory of the BMS, i(t−1) is a current of the module M1 at the time, t−1 stored in the memory of the BMS, Vsoc(t−1) is an open circuit voltage of the module M1 at the time, t−1 stored in the memory of the BMS, α is a reciprocal number of the product (τs) of the charge transfer resistance Rs and the double layer capacitance Cs, which is 1/τs, β is (Ri+Rs)/τs, and ΔT is the change of temperature at the time period of t−1 to t.

Namely, the internal resistance Ri, charge transfer resistance Rs, and double layer capacitance Cs can be calculated from the changes in terminal voltage Vt(t), current i(t), and open circuit voltage Vsoc(t) of Formula 2. In more detail, from the changes in voltage and current, the internal resistance Ri, charge transfer resistance Rs, and double layer capacitance Cs can be calculated by using the least square method. From the internal resistance Ri, charge transfer resistance Rs, and double layer capacitance Cs, the total resistance Rt(t) is calculated, thereby being able to determine whether the battery is deteriorated as detailed below.

It is then determined whether the calculated total resistance Rt(t) is greater than a total resistance Rt(t−a) by a predetermined percent (Y %) (S4). The total resistance Rt(t−a) refers to a total resistance of the module M1 stored in the memory of the BMS at a time t−a when it is determined that the battery is deteriorated. In more detail, whether the temperature T(t−a) is the same as the temperature T(t) and whether the calculated total resistance Rt(t) increases from Rt(t−a) by a predetermined percent are determined. The predetermined percent may be set in accordance with the features of the battery. An example there of is 5%. If the Rt(t) increases by a predetermined percent, Rt(t−a) stored in the memory of BMS is replaced with Rt(t).

If the temperature T(t−a) is different from the temperature T(t), the resistance Rt(t) may change according to the change of the temperature. The change of the resistance Rt(t) according to the change of the temperature is calculated by using the equation, Rt(t)=exp(−T(t)/x), where x is a constant that represents a degree of change of the total resistance according to change of temperature of M1. The constant x can be calculated from two total resistances corresponding to two different temperatures.

FIG. 3 is a resistance and temperature table that shows the total resistance Rt(t−a) of M1 at the time, t−a. For illustration, when the temperature of M1 at the time, t−a, is B and the temperature of M1 at the time, t, is B, the total resistance Rt(t) is compared with X2 which is the resistance at a temperature that is the same as the temperature A.

If the temperature T(t−a) is different from the temperature T(t), the total resistance Rt(t−a) at a temperature that is the same as T(t) is obtained from the resistance and temperature table stored in the memory of the BMS and the obtained Rt(t−a) is compared with the Rt(t). If the Rt(t) is greater than the Rt(t−a) by Y %, it is determined that deterioration of the battery occurs, in which case the resistance and temperature table stored in the memory of the BMS is updated (S51). On the other hand, if the Rt(t) is not greater than the Rt(t−a) by Y %, the resistance and temperature table stored in the memory of the BMS is maintained (S52).

In the step of S51, the resistance and temperature table is updated by changing the total resistances with respect to the respective temperatures by using R(t)=exp(−temperature/x).

If the temperature T(t) and the temperature T(t−a) are same and the Rt(t) is greater than the Rt(t−a) by Y %, it is determined that deterioration of the battery occurs. In this case, the resistance and temperature table stored in the memory of the BMS is updated (S51). On the other hand, if the temperature T(t) and the temperature T(t−a) are same and the Rt(t) is not greater than the Rt(t−a) by Y %, it is determined that such deterioration does not occur. In this case, the resistance and temperature table stored in the memory of the BMS is maintained (S52).

If it is determined that the battery deterioration occurs, currents and voltages of the other modules than the module M1 are measured by a current/voltage sensor(s) provided corresponding to the other modules, and the change of the currents and voltages is collected and stored in the memory of the BMS (S6).

From the change of the currents and voltages of the other modules, the total resistances of the other modules are calculated by using, e.g., a least square method and a total resistance of the entire modules including M1 is calculated (S7). The calculation of the total resistances of the other modules can be made in the same way as the calculation of the total resistance of the module M1.

From the resistance and temperature table with respect to M1, a temperature corresponding to the total resistance of the entire modules can be estimated (S8).

With the above-described temperature estimating method, whether the deterioration of a battery occurs can be determined by using a temperature measured by a temperature sensor mounted in a predetermined module of a battery and a resistance calculated from current and voltage values of the predetermined module, thereby minimizing the number of temperature sensors.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of estimating a temperature of a battery, the method comprising the step of:
    measuring a temperature of a predetermined module of modules of the battery at predetermined time intervals by using a temperature sensor mounted in the predetermined module;
    measuring a current and a voltage of the predetermined module at predetermined time intervals respectively by using a current sensor and a voltage sensor mounted in the predetermined module and calculating the change of the currents and voltages;
    calculating a resistance of the predetermined module by using the change of the currents and voltages;
    determining whether the calculated resistance increases by a predetermined amount at predetermined time intervals and whether the temperature of the predetermined module changes at the predetermined time interval;
    measuring currents and voltages of the other modules and calculating the change of currents and voltages;
    calculating a total resistance of the entire modules from the change of the currents and voltages; and
    estimating the temperature of the battery by identifying a temperature corresponding to the total resistance in a preset resistance and temperature table,
    wherein the step of determining whether the calculated resistance increases and whether the temperature of the predetermined module changes comprises determining whether when the temperature $T(t)$ of the predetermined module at a time, t and the temperature $T(t-a)$ of the predetermined module at a time, t-a are different and whether the resistance $Rt(t)$ of the predetermined module at the time, t increases with respect to the resistance $Rt(t-a)$ of the predetermined module at the time, t-a by a predetermined amount according to change of the temperature.

2. The method of claim 1, wherein if it is determined that the temperature $T(t)$ and the temperature $T(t-a)$ are different and the resistance $Rt(t)$ increases with respect to the resistance $Rt(t-a)$ by the predetermined amount, it is determined that deterioration of the battery occurs.

3. The method of claim 2, wherein if it is determined that deterioration of the battery occurs, the preset resistance and temperature table is updated.

4. The method of claim 1, wherein if it is determined that the temperature $T(t)$ and the temperature $T(t-a)$ are different and the resistance $Rt(t)$ does not increase with respect to the $Rt(t-a)$ by the predetermined amount, it is determined that deterioration of the battery does not occur.

5. The method of claim 4, wherein if it is determined that deterioration of the battery dose not occur, the preset resistance and temperature table is maintained.

6. The method of claim 1, wherein if it is determined that the temperature $T(t)$ and the temperature $T(t-a)$ are same and the resistance $Rt(t)$ increases with respect to the resistance $Rt(t-a)$ by the predetermined amount, it is determined that deterioration of the battery occurs.

7. The method of claim 6, wherein if it is determined that deterioration of the battery occurs, the preset resistance and temperature table is updated.

8. The method of claim 1, wherein if it is determined that the temperature $T(t)$ and the temperature $T(t-a)$ are same and the resistance $Rt(t)$ does not increase with respect to the $Rt(t-a)$ by the predetermined amount, it is determined that deterioration of the battery does not occur.

9. The method of claim 8, wherein if it is determined that deterioration of the battery does not occur, the preset resistance and temperature table is maintained.

* * * * *